(12) United States Patent
Durfey

(10) Patent No.: US 10,737,785 B1
(45) Date of Patent: Aug. 11, 2020

(54) PERSONAL FLYING WATER JET BOARD SYSTEM

(71) Applicant: Cody E. Durfey, Kaysville, UT (US)

(72) Inventor: Cody E. Durfey, Kaysville, UT (US)

( * ) Notice: Subject to any disclaimer, the term of this patent is extended or adjusted under 35 U.S.C. 154(b) by 275 days.

(21) Appl. No.: 15/969,416

(22) Filed: May 2, 2018

(51) Int. Cl.
*B63H 11/04* (2006.01)
*B64C 39/02* (2006.01)
*B64D 3/00* (2006.01)
*B63H 11/00* (2006.01)

(52) U.S. Cl.
CPC ............ *B64C 39/026* (2013.01); *B63H 11/04* (2013.01); *B64D 3/00* (2013.01); *B63H 2011/006* (2013.01)

(58) Field of Classification Search
CPC .. B64C 39/026; B63H 11/04; B63H 2011/006
See application file for complete search history.

(56) References Cited

U.S. PATENT DOCUMENTS

| | | | |
|---|---|---|---|
| 3,200,421 A | 8/1965 | Williams | |
| 3,273,333 A | 9/1966 | Roulund | |
| 3,294,345 A | 12/1966 | Cottrell | |
| 3,352,275 A | 11/1967 | Wilson | |
| 3,408,975 A | 11/1968 | Gamble | |
| 4,993,977 A | 2/1991 | Rodler, Jr. | |
| 5,237,952 A | 8/1993 | Rowe | |
| 5,979,350 A | 11/1999 | Larson et al. | |
| 6,192,819 B1 | 2/2001 | Larson et al. | |
| 7,258,301 B2 | 8/2007 | Li | |
| 7,614,355 B2 * | 11/2009 | Zeyger | B63H 11/00 114/55.58 |
| 8,960,115 B2 | 2/2015 | Frisky | |
| 9,315,237 B2 | 4/2016 | Snook et al. | |
| 9,409,634 B1 | 8/2016 | Moses | |
| 9,751,597 B1 * | 9/2017 | Low | B63B 25/002 |
| 10,118,677 B2 * | 11/2018 | Zapata | B63H 11/113 |
| 2008/0014811 A1 | 1/2008 | Zeyger | |
| 2011/0056422 A1 | 3/2011 | De Masi, Sr. | |
| 2014/0134900 A1 * | 5/2014 | Derrah | B63H 11/04 440/6 |
| 2015/0028161 A1 | 1/2015 | Parks | |

* cited by examiner

*Primary Examiner* — Brian M O'Hara
*Assistant Examiner* — Keith L Dixon
(74) *Attorney, Agent, or Firm* — Suzanne Kikel, Patent Agent

(57) ABSTRACT

A personal flying water jet board system includes a jet board with a water jet propulsion system. A water intake system mounted on either side of a boat includes an intake member submerged in the water and connected to a hose which is connected to jet nozzles of the jet board. The water injected into the jet nozzles propels the jet board and user above the water. A water intake system mounted on the boat is fluidically connected to the hose and directs water into the jet nozzles. Water-conducting support pipes have intake members with an intake end oriented towards the forward end of the boat to receive water as the boat moves forward and a discharge end. The intake end of the intake member is shaped to increases the water pressure as the water flows into the discharge end thereof and into the water-conducting support pipes.

14 Claims, 3 Drawing Sheets

PERSONAL FLYING WATER JET BOARD SYSTEM

BACKGROUND OF THE INVENTION

1. Field of the Invention

This invention relates, in general, to power water sports and recreation, and in particular, to sports involving towed elements. More particularly, the invention relates to a personal flying water jet board system which is water propelled to raise the jet board and user into the air and then while in the air towed by a power boat.

2. Brief Description of the Prior Art

Recreational water sports that involve powered vehicles are quite popular. For example, personal water crafts (PWCs) that allow one or more riders to sit on the personal water craft and to travel over the water have recently become quite popular and are often seen being used on lakes, oceans and other bodies of water. There are also many types of water sports that involve a tow vehicle, such as a boat or a PWC, pulling a person over the water surface with the person riding on water skis or a wakeboard.

The popularity of these water-based activities is generally a result of many different factors and involves warm weather and getting wet. Also, if a person were to fall into the water, the water is much more forgiving then if the person were to fall on the land.

Personal towing platform devices which are equipped with a hydrodynamic lifting force include water skis, underwater wings, and stepped hydroplanes. When the towing reaches a certain speed, the platform tends to lift off of the water's surface. However, in most known devices, the platform does not completely lift off of the water surface since these present-day devices require some contact with the water surface in order for them to function.

As an adjunct to water skiing, a kite has been developed which is supported above the water skier and ridden by the water skier to lift the water skier airborne after proceeding along the water on conventional water skis until a minimum speed is reached. The thrill and enjoyment of such a ride are apparent, but the strength required by the user and the difficulty of operating such a kite limit the use of such kites to a few people who have proper training and skill. The natural instability of the kite and the precarious position of the operator-skier often result in mishaps during flight and landing and possible injuries to the operator-skier.

Many of these present-day water devices have other disadvantages. Many are cumbersome and require the user to be strapped to the body unit thereby preventing the user from easily releasing himself/herself from the device when necessary or desirable. Additionally, if the user were to crash (known as wiping out) into the water, the user may find himself/herself underwater while still being strapped to the body unit. Additionally, a novice may be unfamiliar with the controls of the device and it may take some time for the novice to learn how to operate the device.

There is a need in the art to provide a personal flying water jet board system which while being towed is lifted completely off of the water's surface and soars through the air.

There is a further need in the art to provide a water propulsion flying craft which is towed by a boat and wherein the user rides on top of the craft and wherein the user has a greater degree of control and safety as well as a unique experience.

SUMMARY OF THE INVENTION

The present invention provides such a personal flying water jet board system. The invention provides a personal flying water jet board system which allows a person to hover on a jet board above the water and behind a power boat. The system is designed to use the water source, i.e. lake or ocean on which the power boat is traveling to propel the user into the air and the user to ski in the air above and behind the power boat.

The personal flying water jet board system contains a jet board with a water jet propulsion system. A water intake system is mounted on the boat and includes two water-conducting support pipes, each of which is attached on either side of the power boat. The support pipes are connected to a hose via a fluid connector. An intake member is attached to the end of each water-conducting support pipe, is submerged in the water, and is connected to the hose which, in turn, is connected to jet nozzles of the water jet propulsion system which is located on the underside of the jet board. The water injected into the jet nozzles propels the jet board and user above the water. Each intake member of the support pipe has an intake end oriented towards the forward end of the boat to receive water as the boat moves forward and a discharge end directly connected to the support pipe. The intake end of the intake member is shaped to increases the water pressure as the water flows into the discharge end thereof and into the water-conducting support pipes, and ultimately into the water jet propulsion system of the jet board.

The water-conducting pipes are attached to the side of the power boat. These pipes have screened intakes which are submerged into the water when the water intake system is submerged into the water and the water intake system directs the water into a hose that is fluidically connected to the jet nozzles mounted underneath the jet board. The jet board embodying the present invention propels a person above the water and into the air behind the power boat.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims.

These and other features and advantages of the present invention will be better appreciated and understood when the following description is read in light of the accompanying drawings.

BRIEF DESCRIPTION OF THE DRAWINGS

The components in the figures are not necessarily to scale, emphasis instead being placed upon illustrating the principles of the invention. Moreover, in the figures, like referenced numerals designate corresponding parts throughout the different views.

DETAILED DESCRIPTION OF THE INVENTION

Figure 1:
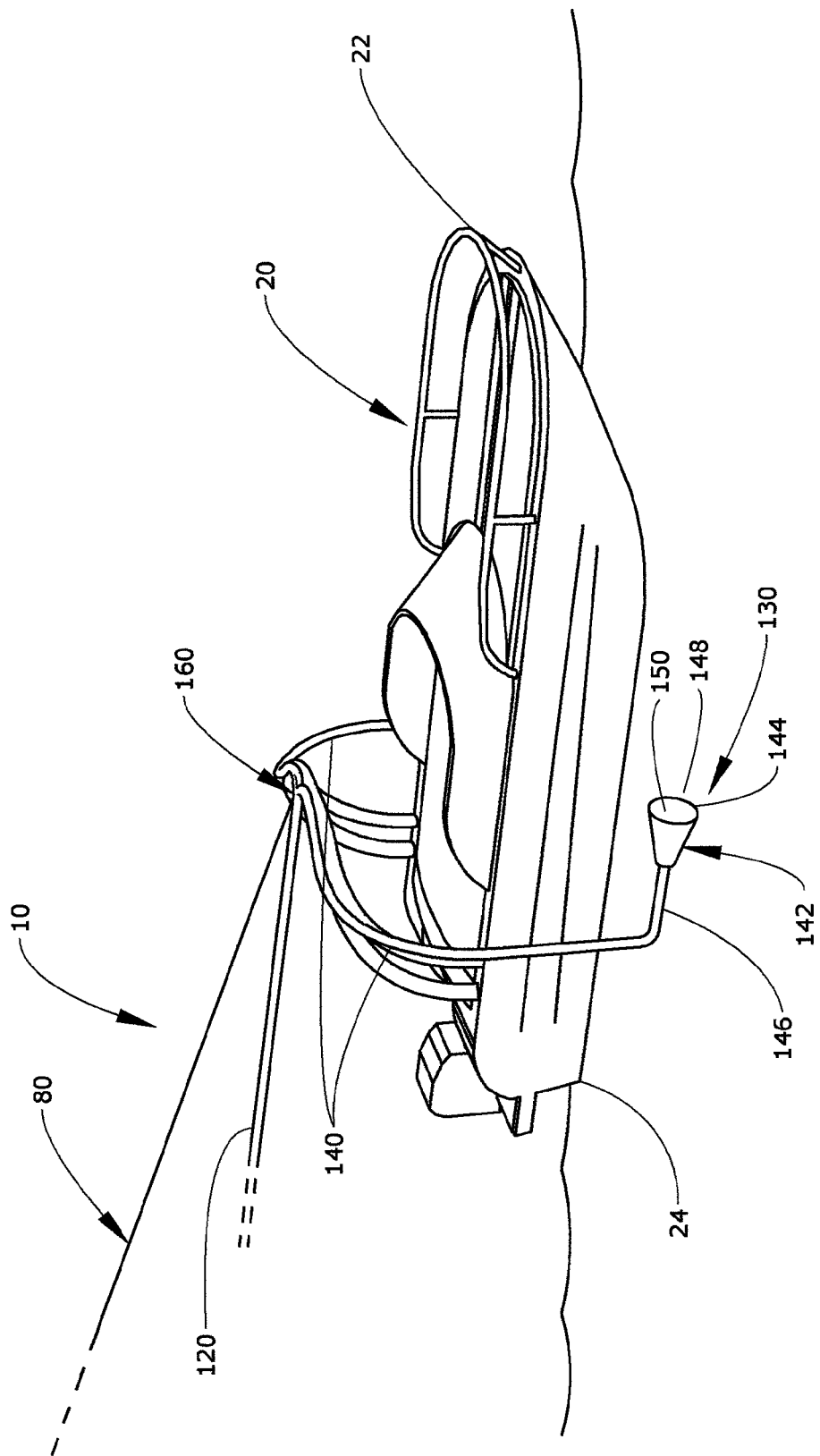
FIG. 1 is a schematic perspective view of a power boat and some components of a personal flying water jet board system of the present invention.
Figure 2:
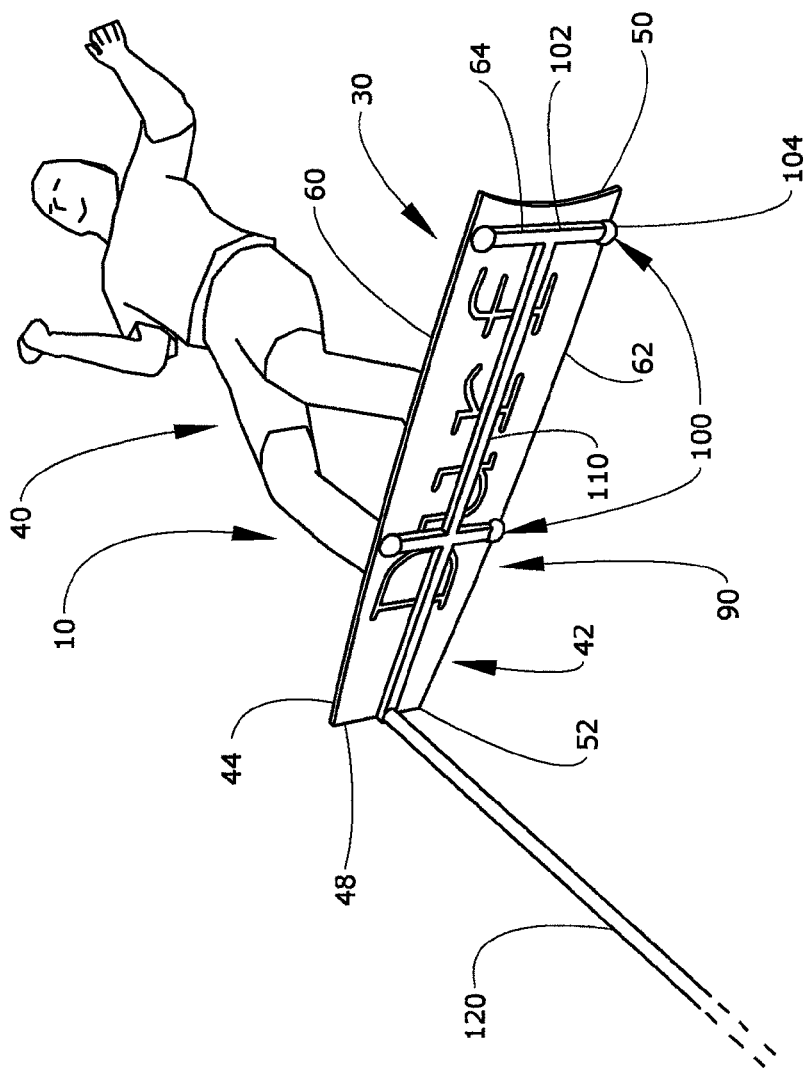
FIG. 2 is a schematic perspective view of the personal flying water jet board system of the present invention illustrating a rider/user thereon.

Referring to FIGS. 1 and 2, it can be understood that the present invention is embodied in a personal flying water jet board system 10 which is propelled by a power boat 20 which moves over the surface of a body of water indicated in FIG. 1 by surface W, and which power boat 20 has a forward end 22 and an aft end 24.

Referring particularly to FIG. 2, a jet board 30 supports a user 40 when the personal flying water jet board system 10 is in use. The jet board 30 includes a base 42 which has a first surface 44 which is a top surface on which user 40 stands, a second surface 46 which is a bottom surface, and further includes a first end 48, a second end 50, and a longitudinal axis 52 extending between the first end 48 and the second end 50. The jet board 30 further includes a first side edge 60 which is a leading side edge when the jet board is in use, a second side edge 62 which is a trailing side edge when the jet board is in use, and a transverse axis 64 extending between the first side edge 60 and second side edge 62. Even though not shown, it is to be understood that user 40 is attached to jet board 30 via devices which are located on the top surface 44 and in which user 40 inserts his/her feet for releasably attaching the user to the board. These devices may be designed so the user can position his feet in an orientation and combination that is most comfortable to the user. Such devices may comprise loose fitting boots with repositioning bindings so that the user 40 may choose which foot is in the front, or the best angle for his feet, and/or the most appropriate positioning of his feet. Also, such boots may be detachable in case of a hard wipe out by the user. Such devices are well-known to those skilled in the art and are readily available in the market place. As shown in FIG. 1, a tow rope 80 is attached to power boat 20 at its one end and even though not shown to jet board 30 at its opposite end.

Referring particularly to FIG. 2, system 10 further includes a water jet propulsion system 90 mounted on the bottom surface of jet board 30 for elevating and then levitating jet board 30 and user 40 above the water surface W while jet board 30 along with user 40 are being towed by power boat 20. Water jet propulsion system 90 includes two jet nozzles 100 oriented to extend in the direction of the transverse axis 64 of base 42. Each jet nozzle 100 has an intake section 102 and a discharge end 104. The discharge end 104 of each jet nozzle 100 is located adjacent to the trailing side edge 62 of jet board 30 and the discharge end 104 is oriented to discharge water out of and away from the second side edge 62 of jet board 30 in order to propel jet board 30 upward and above water surface W and forward toward boat 20 when water is being discharged from jet nozzles 100. The exact structure of jet nozzles 100 is not part of the claimed invention and therefore will not be further discussed. However, one skilled in the art will be able to understand how to build such nozzles from the teachings of U.S. Pat. No. 3,273,333, entitled Water Jet Propulsion Device, issued to Poul B Roulund; U.S. Pat. No. 3,408,975, entitled Water Jet Propulsion Device, issued to Richard B Gamble; and U.S. Pat. No. 4,993,977, entitled Water Jet Propulsion Module, issued to Waldo E. Rodler, Jr. The disclosures of these patents are incorporated herein by reference. Stability of jet board 30 can be affected using systems such as disclosed in published U.S. Patent Application No. 2015/0028161, the disclosure of which is incorporated herein by reference. Even though it is important for jet board 30 to be stabilized, the particular means for stabilizing jet board 30 is not part of the present invention and therefore will not be described further.

Referring again to FIG. 2, bottom surface 46 of base 42 of jet board 30 further includes a water manifold 110 which is oriented to extend in the direction of the longitudinal axis 52 of base 42. Water manifold 110 is fluidically connected to intake section 102 of each jet nozzle 100 and is constructed and arranged to conduct water into jet nozzles 100 and which water is discharged out of discharge end 104 of the nozzles.

As shown in FIGS. 1 and 2, a hose 120 is fluidically connected to water manifold 110 in order to conduct the water into water manifold 110 for distribution from water manifold 110 and into jet nozzles 100. Preferably, hose 120, is releasably attached to jet board 30 through means known to those skilled in the art so that hose 120 can be readily detached from jet board 30 in the event that user 40 wipes out and that the downed user is not dragged along the water surface W by power boat 20. Conversely, a hose retainer (not shown) may be provided which is structured to be releasably attached to the user's wrist such that hose 120 can be easily detached from user 40 in the event user 40 does wipe out. Such hose retainer will be constructed to prevent user 40 from being dragged along the water surface.

Even though not shown in FIG. 2, it is to be appreciated that tow rope 80 of FIG. 1 is securely attached to first end 48 of jet board 30 along with hose 120.

Referring again to FIG. 1, a water intake system 130 is mounted on boat 20 and is fluidically connected to hose 120 in order to conduct or direct the water obtained from the body of water adjacent to boat 20 and into hose 120 for subsequent flow or distribution into water manifold 110 on the bottom surface 46 of base 42 of jet board 30 (FIG. 2). Water intake system 130 comprises a plurality of water-conducting support pipes 140, which are removably mounted on the boat. Support pipes 140 extend from a location adjacent to the side of boat 20 to a location above boat 20. Water intake system 130 may be made of aluminum or other suitable material. Hose 120 may contain a cable lining in order to prevent stretching of the hose and/or to increase its durability. Also, a hose retainer may be provided which would be attached to the wrist of the rider/user by a cord so that the rider/user could be easily detached from the hose 120 during a hard wipe out. Such retainer devices are well-known to those skilled in the art and are available in the marketplace.

Still referring to FIG. 1, each support pipe 140 comprises an intake member 142. Even though only one intake member 142 is shown in FIG. 1, it is to be understood that a similar intake member 142 is provided on support pipe 140 on the other side of boat 20. Intake member 142 has an intake end 144 which is oriented towards the forward end 22 of the boat to collect water as the boat moves forward and a discharge end 146 oriented toward the aft end 24 of the boat. Discharge end 146 is fluidically connected to its respective support pipe 140 such that the water being brought into intake member 142 is delivered directly into a respective support pipe 140 for deliverance of the water into hose 80 and into jet propulsion system 90 of jet board 30, more of which is discussed herein below. Each intake member 142 is in the shape of a converging nozzle which increases water pressure as the water flows from intake end 144 of intake member 142 to the discharge end 144 of intake member. The intake end 144 of each intake member 142 is submerged in the water when the boat is in the water in order to forced water there into when boat 20 is moving through the water. Discharge end 146 of each intake member 142 is fluidically connected to an associated support pipe 140 so as to direct water into support pipe 140 for distribution thereof to jet nozzles 100 via hose 120 and water manifold 110. In an embodiment of the invention, intake end 144 of each intake member 142 is approximately four times as large as the discharge end 146. For example, intake end 144 may be approximately 48 inches and discharge end 146 may be approximately 12 inches. Furthermore, fins, such as that indicated by reference numeral 148, may be provided in proximity to the intake end 144 of each intake member 142 so as to create a desired turbulence at the intake section in order to increase the pressure inside each intake member 142. Fins 148 may be releasably attached to intake member 142 and a screened filter indicated at reference 150 may be provided to cover the intake end 144 of the intake members 142. Screened intake members 142 may also include stabilizers (not shown) in order to insure that the intake members 142 remain in a pointed forward position relative to power boat 20, and to enable intake members 142 to take in as much water flow as possible.

Figure 3:
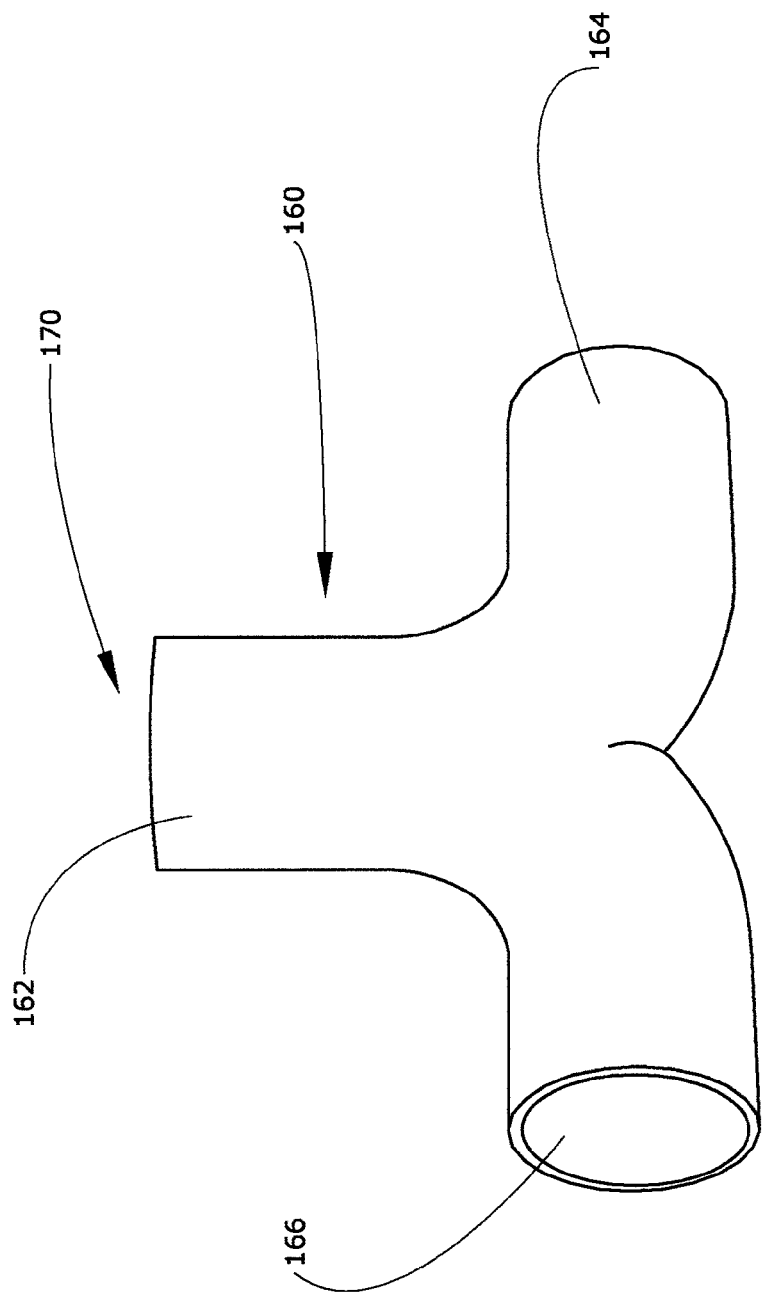
FIG. 3 is an enlarged, perspective front view of a fluid connector used in the personal flying water jet board system of the present invention.

Referring to FIGS. 1 and 3, a fluid connector 160 is provided in an embodiment of the invention. As shown in FIG. 1, fluid connector 160 is located between hose 120 and each support pipe 140. As shown in FIG. 3, fluid connector 160 is essentially T-shaped and consists of three pipes 162, 164, 166 each of which is fluidically connected relative to each other and hose 120 and support pipes 140. As is apparent, pipe 162 is fluidically connected to hose 120 and each pipe 164 and 166 is fluidically connected to a respective support pipe 140. Preferably, fluid connector 160 is remotely controlled. To this end, a remote control mechanism, shown at reference numeral 170 in FIG. 3, is provided and is associated with fluid connector 160 so that the amount of water direct into water manifold 110 may be remotely controlled, preferably by a hand-held device (not shown) which would be operated by user 40. It is to be understood that remote control mechanism 170 and the hand-held device (not shown) are generally well-known to those skilled in the art and are readily available in the market place. Preferably, a remote hand-held device is a simple device which can be easily operated by user 40 and contains controls which can easily and quickly increase and/or decrease the water flow and therefore, the force of water being directed into hose 120 and jet propulsion system 90 of jet board 30.

It is to be appreciated that water intake system 130 along with its supporting pipes 140 and intake members 42 are constructed to be easily removable from power boat 20 in order to load the power boat 20 onto a trailer, and at the same time be constructed to be firmly attached to the sides of power boat 20 in order to withstand the forces of the incoming water flow. Intake members 42 may be welded to its respective supporting pipe 140 and hose 120, and supporting pipes 140 may be welded to fluid connector 160 and/or suitable gaskets (not shown) may be provided to insure that little or no pressure is lost in the personal flying water jet board system of the invention. Additionally, instead of fluid connector 160 being in a T-shape configuration, fluid connector 10 may be in a Y-shape configuration. Both the T-shape fluid connector and the Y-shape fluid connector are pipes readily available in the market place.

While the present invention has been described in connection with the preferred embodiments of the various figures, it is to be understood that other similar embodiments may be used or modifications and additions may be made to the described embodiment for performing the same function of the present invention without deviating there from. Accordingly, it is intended by the appended claims to cover all such changes and modifications as come within the spirit and scope of the invention.

What is claimed is:

1. A personal flying water jet board system, propelled by a power boat, the personal flying water jet board system comprising:
   a jet board constructed to support a user, the jet board having a base with a first surface which is a top surface on which the user stands, a second surface which is a bottom surface, a first end, a second end, a longitudinal axis extending between the first end and the second end, a first side edge which is a leading side edge when the board is in use, a second side edge which is a trailing side edge when the board is in use, and a transverse axis extending between the first side edge and the second side edge;
   a water jet propulsion system mounted on the bottom surface of the jet board and having a plurality of jet nozzles oriented to extend in the direction of the transverse axis of the base of the jet board, each jet nozzle having an intake section and a discharge section;
   a water manifold oriented to extend in the direction of the longitudinal axis of the base of the jet board and fluidly connected to the intake section of each jet nozzle for conducting water through each jet nozzle and out of the discharge end of each jet nozzle in the direction of the transverse axis of the jet board, the discharge end of each nozzle being located adjacent to the second side edge of the jet board and oriented with respect to the second side edge of the jet board such as to discharge water out of and away from the second side edge of the jet board for propelling the jet board through the air;
   a hose fluidly connected to the water manifold to direct water into the water manifold for distribution thereof to the jet nozzles;
   a water intake system removably mounted on the power boat and fluidly connected to the hose for directing water from a water source adjacent the power boat and into the hose for distribution into the water manifold and having a plurality of water-conducting support pipes;
   each water-conducting support pipe having an intake member with an intake end oriented towards the forward end of the power boat to accept water as the power boat moves forward and a discharge end oriented toward the aft end of the power boat, and each intake member being in the shape of a converging nozzle which increases the water pressure as the water flows from the intake end of the intake member to the discharge end of the intake member, the intake end of each intake member being positioned to be submerged in the water when the power boat is in a body of water and to have the water forced into each intake member when the power boat moves through the water, the discharge end of each intake member being fluidly connected to an associated water-conducting support pipe to force the water into each water-conducting support pipe for redirection of the water into each jet nozzle via the hose and the water manifold; and,
   a fluid connector fluidly connecting each water-conducting support pipe to the hose.

2. The personal flying water jet board system of claim 1, wherein the water-conducting support pipes are constructed and arranged to extend from adjacent a side of the power boat to a location above the power boat.

3. The personal flying water jet board system of claim 1, further including a towrope connecting the jet board to the power boat.

4. The personal flying water jet system of claim 1, wherein the fluid connector contains a remote control.

5. The personal flying water jet system of claim 1, further including filters in the intake members mounted on the water-conducting support pipes.

6. The personal flying water jet system of claim 5, further including fins removably attached to the water intake members adjacent to the intake end thereof.

7. The personal flying water jet system of claim 1, wherein the hose is releasably connected to the water manifold and constructed to be released in the event of a wipe out.

8. A personal flying water jet board system powered by a power boat, the personal flying water jet board system comprising:
   a jet board for supporting a user and having a base with a first surface which is a top surface on which a user stands and a second surface which is a bottom surface;
   a water jet propulsion system mounted on the bottom surface of the jet board and including at least one jet nozzle having an intake section and a discharge section to discharge water to propel the jet board;
   a hose fluidly connected to the jet nozzle to conduct water into the jet nozzle;
   a water intake system releasably mounted on the boat and fluidly connected to a hose to direct water from a body of water adjacent to the boat into the hose for direction to the jet nozzle, the water intake system comprising:
   at least one water-conducting support pipe removably mounted on the power boat, and an intake member mounted on the water-conducting support pipe, the intake member having an intake end oriented towards the forward end of the boat to accept water as the boat moves forward and a discharge end and the intake member being shaped to increases water pressure as the water flows from the intake end of the intake member to the discharge end of the intake member, the intake end of the intake member being submerged when the power boat is in the water to have water forced therein when the power boat moves through the water, the discharge end of the intake member being fluidly connected to the water-conducting support pipe to direct water therein for redirection of the water into the jet nozzle.

9. The personal flying water jet board system of claim 8, wherein the jet board has a first side edge which is a leading edge when the jet board is in use, a second side edge which is a trailing edge when the jet board is in use, and a transverse axis extending between the first side edge and the second side edge, the at least one jet nozzle on the jet board being mounted thereon to be oriented to direct water being ejected from the at least one jet nozzle in the direction of the transverse axis of the jet board.

10. The personal flying water jet board system of claim 8, wherein the water jet propulsion system on the jet board includes a second jet nozzle.

11. The personal flying water jet board system of claim 10, wherein the water propulsion system on the jet board further includes a water manifold fluidly connected to the hose and to the at least one jet nozzle and a second nozzle.

12. The personal flying water jet board system of claim 8, further including a filter in teach of the intake members mounted on the water-conducting support pipes.

13. The personal flying water jet board system of claim 8, further including a fin removably attached to the water intake member adjacent to the intake end thereof.

14. The personal flying water jet board system of claim 11, wherein the hose is releasably connected to the water manifold and constructed to be released in the event of a wipe out.

* * * * *